(12) United States Patent
Zhao et al.

(10) Patent No.: US 12,026,126 B2
(45) Date of Patent: Jul. 2, 2024

(54) MARKERS FOR HASH CODE CALCULATIONS ON OCCUPIED PORTIONS OF DATA BLOCKS

(71) Applicant: Samsung Electronics Co., Ltd., Suwon-si (KR)

(72) Inventors: Jian Zhao, Hayward, CA (US); Hui-Juan Li, San Jose, CA (US); Rong Zheng, San Jose, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 0 days.

(21) Appl. No.: 18/088,768

(22) Filed: Dec. 26, 2022

(65) Prior Publication Data

US 2023/0138846 A1 May 4, 2023

Related U.S. Application Data

(63) Continuation of application No. 16/542,292, filed on Aug. 15, 2019, now Pat. No. 11,537,560.

(60) Provisional application No. 62/873,178, filed on Jul. 11, 2019.

(51) Int. Cl.
*G06F 16/13* (2019.01)
*G06F 11/10* (2006.01)
*G06F 12/02* (2006.01)
*G06F 16/14* (2019.01)

(52) U.S. Cl.
CPC ........ *G06F 16/137* (2019.01); *G06F 11/1004* (2013.01); *G06F 12/023* (2013.01); *G06F 16/152* (2019.01)

(58) Field of Classification Search
None
See application file for complete search history.

(56) References Cited

U.S. PATENT DOCUMENTS

| 6,324,631 | B1 | 11/2001 | Kuiper |
| 7,801,121 | B1 | 9/2010 | Van Wageningen et al. |
| 7,840,873 | B2 | 11/2010 | Hughes et al. |
| 10,120,875 | B1 | 11/2018 | Duggal et al. |
| 2003/0028547 | A1 | 2/2003 | Boa et al. |
| 2004/0025105 | A1 | 2/2004 | Doubler et al. |
| 2008/0222488 | A1 | 9/2008 | Anderson et al. |
| 2014/0068120 | A1 | 3/2014 | Tanaka |
| 2018/0088815 | A1 | 3/2018 | Lei et al. |
| 2018/0090184 | A1 | 3/2018 | Lee |

(Continued)

FOREIGN PATENT DOCUMENTS

KR 20080063185 A 7/2008

OTHER PUBLICATIONS

Notice of Allowance for U.S. Appl. No. 16/542,292, dated Jul. 27, 2022.

(Continued)

*Primary Examiner* — Eddy Cheung
(74) *Attorney, Agent, or Firm* — Renaissance IP Law Group LLP

(57) ABSTRACT

A method for performing hash code calculations may calculate, during a write operation for a data block, a hash code for an occupied portion of the data block, insert, during the write operation, a marker into the data block, calculate, during a read operation for the data block, a hash code for the occupied portion of the data block, search, during the read operation, for the marker in the data block, and terminate the hash code calculation in response to finding the marker.

19 Claims, 10 Drawing Sheets

(56) References Cited

U.S. PATENT DOCUMENTS

2019/0258728 A1  8/2019  Watkins
2020/0026427 A1  1/2020  Peleg et al.
2020/0371861 A1  11/2020  Chen et al.

OTHER PUBLICATIONS

Office Action for U.S. Appl. No. 16/542,292, dated Jan. 24, 2022.

MARKERS FOR HASH CODE CALCULATIONS ON OCCUPIED PORTIONS OF DATA BLOCKS

CROSS-REFERENCE TO RELATED APPLICATIONS

This application is a continuation of U.S. patent application Ser. No. 16/542,292, filed Aug. 15, 2019, which claims priority to, and the benefit of, U.S. Provisional Patent Application Ser. No. 62/873,178, filed Jul. 11, 2019 which are both incorporated by reference.

BACKGROUND

1. Field

This disclosure relates generally to data blocks and specifically to markers for hash code calculations on occupied portions of data blocks.

2. Related Art

Data is frequently broken up into blocks for storage, processing, and transfer. To provide a high level of data integrity, a small portion of each data block may be used to store a hash code. This hash code may be used to check for errors in the user data in the remaining portion of the block. For example, when a block of data is to be written to a non-volatile memory device, a hash code for the block may be calculated by processing the data in the user portion of the block with a hash function. The calculated hash code is stored in the block with the user data. When the data block is read from the device, the data in the user portion of the block is processed using the same hash function to calculate the hash code again. If the hash code calculated during the read operation matches the hash code that was stored in the block during the write operation, the match may be indicative that there are no errors in the user data.

SUMMARY

A method for performing hash code calculations may include calculating, during a write operation for a data block, a hash code for an occupied portion of the data block, inserting, during the write operation, a marker into the data block, calculating, during a read operation for the data block, a hash code for the occupied portion of the data block, searching, during the read operation, for the marker in the data block, and terminating the hash code calculation in response to finding the marker.

The marker may include a constant portion and a variable portion. The method may further include determining the variable portion of the marker based on the hash code for the occupied portion of the data block. The marker may include a tail mark placed after the occupied portion of the data block. The tail mark may be placed at the end of the occupied portion of the data block. The method may further include determining that the size of the unoccupied portion of the data block is smaller than the marker, and omitting the marker from the unoccupied portion of the data block. The method may further include determining that the size of the unoccupied portion of the data block is smaller than the marker, and adding padding data to the unoccupied portion of the data block. The method may further include searching for a false marker in the occupied portion of the data block, and modifying the hash code for the occupied portion of the data block in response to the false marker.

A system may include a first interface configured to receive data blocks, a second interface configured to transmit data blocks, and hash logic coupled between the first and second interfaces, wherein the hash logic is configured to calculate a hash code for the occupied portion of a data block received through the first interface, and insert a marker in an unoccupied portion of the data block.

The first interface may be configured to transmit data blocks, the second interface may be configured to receive data blocks, and the hash logic may be configured to search for a marker in a data block received through the second interface to determine an occupied portion of the data block, calculate a hash code for the occupied portion of the data block, and terminate calculating the hash code in response to finding the marker. The hash logic may be further configured to search for a false marker in the occupied portion of the data block, and modify the hash code for the occupied portion of the data block in response to the false marker. The hash logic may be further configured to modify the hash code for the occupied portion of the data block by creating a unique hash code for the occupied portion of the data block. The first interface may include a host interface, and the second interface comprises a non-volatile memory interface. The non-volatile memory interface may include a flash memory interface, and the system may further include a processor configured to implement a flash translation layer. The processor may be configured to implement a file system for the flash translation layer.

A method for performing hash code calculations may include calculating a first hash code corresponding to user data, wherein the user data is substantially limited to an occupied portion of a data block, inserting the first hash code into the occupied portion of the data block, and inserting a marker into an unoccupied portion of the data block.

The method may further include determining the occupied portion of the data block in response to the marker, calculating a second hash code for user data, wherein the user data is substantially limited to the occupied portion of the data block, comparing the second hash code to the first hash code, and determining the presence of errors in the user data in response to the comparison. The method may further include searching for a false marker in the occupied portion of the data block, and modifying the first hash code in response to the false marker. Inserting a marker into an unoccupied portion of the data block may further include inserting a tail mark at the end of an occupied portion of the data block containing user data. The tail mark may include a constant portion and a variable portion, wherein the variable portion is determined from the first hash code.

BRIEF DESCRIPTION OF THE DRAWINGS

The figures are not necessarily drawn to scale and elements of similar structures or functions are generally represented by like reference numerals for illustrative purposes throughout the figures. The figures are only intended to facilitate the description of the various embodiments described herein. The figures do not describe every aspect of the teachings disclosed herein and do not limit the scope of the claims. The accompanying drawings, together with the specification, illustrate example embodiments of the present disclosure, and, together with the description, serve to explain the principles of the present disclosure.

DETAILED DESCRIPTION

The amount of user data stored in a block may sometimes be smaller than the capacity of the block. For example, some file systems may not allow data from more than one file to occupy a data block. If a file has a small amount of data (e.g., a few bytes) there may be a relatively large amount of unoccupied space in a data block. In systems that calculate hash codes for user data, having partially occupied data blocks may unnecessarily slow down the speed with which the system can perform the hash code calculation, for example, because the hash function may spend time accessing and processing data in portions of the block that are not occupied with user data.

Figure 1:
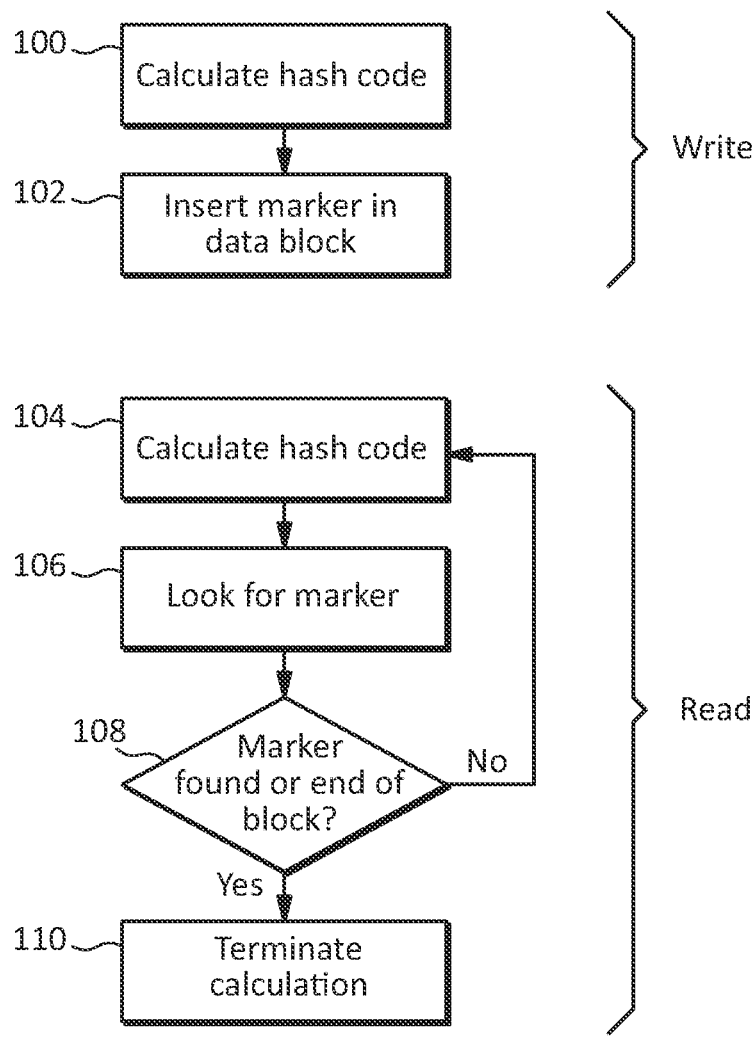
FIG. 1 illustrates an example hash code calculation method according to this disclosure.
Figure 2:
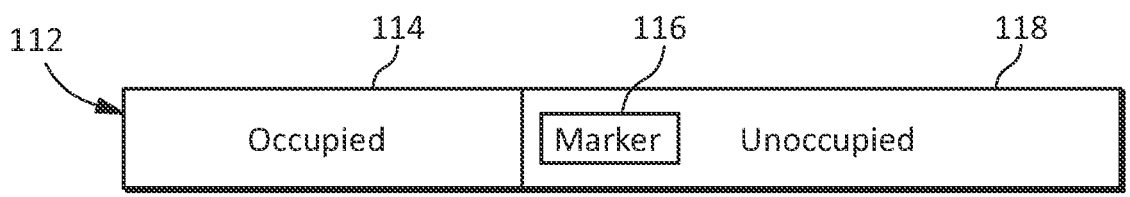
FIG. 2 illustrates an example data block structure that may be used with the method shown in FIG. 1.

FIG. 1 illustrates an example hash code calculation method according to this disclosure. FIG. 2 illustrates an example data block structure that may be used with the method shown in FIG. 1. Referring to FIGS. 1 and 2, during a write operation, a hash code may be calculated at element 100 for an occupied portion 114 of a data block 112. Also during the write operation, a marker 116 may be inserted at element 102 into the unoccupied portion 118 of the data block 112 to indicate the length of the occupied portion 114 of the data block.

During a read operation, the disclosed systems may progressively calculate a hash code at element 104 for the occupied portion 114 of the data block 112 while searching for the marker 116 at element 106. If the marker 116 is not found at element 108, the hash code calculation at element 104 and marker check at element 106 may be repeated until the marker 116 is found or the end of the block is reached at element 108. The hash code calculation at element 104 and marker check at element 106 may then be terminated at element 110.

The method described with respect to FIGS. 1 and 2 may reduce the time spent by the system to calculate hash codes for partially occupied data blocks at least because a hash code calculation may not be performed on unoccupied portions of data blocks.

Figure 3:
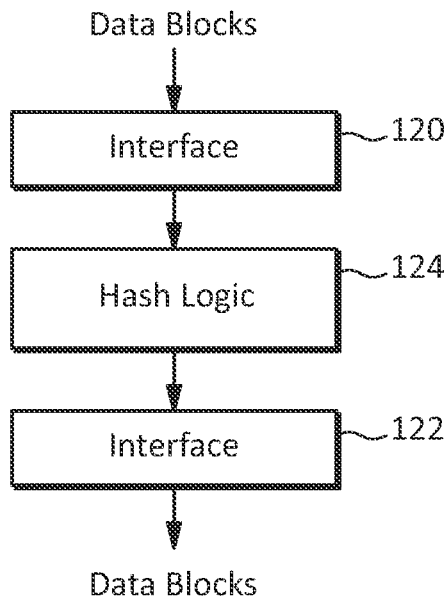
FIG. 3 illustrates an example system that may calculate hash codes for data blocks according to this disclosure.

FIG. 3 illustrates an example system that calculates hash codes for data blocks according to this disclosure. The data block structure shown in FIG. 2 may also be used with the system shown in FIG. 3. The system shown in FIG. 3 includes a first interface 120 configured to receive data blocks 112, a second interface 122 configured to transmit data blocks, and hash logic 124 coupled between the first interface 120 and the second interface 122. The hash logic 124 may be configured to calculate a hash code for the occupied portion 114 of a data block 112. The has logic 124 may be further configured to insert a marker 116 in an unoccupied portion 118 of the data block 112 to indicate the occupied portion 114 of the data block.

Data blocks may flow through the system shown in FIG. 3 in one direction, for example, when writing data. To process data blocks in the other direction, for example, when reading data, the system shown in FIG. 3 may be duplicated and configured to operate in the other direction. The hash logic in the duplicated system may be configured to search for a marker 116 in a data block 112 to determine the occupied portion 114 of the data block 112. The hash logic in the duplicated system may be further configured to calculate a hash code for the occupied portion 114 of the data block 112, and terminate the hash code calculation in response to finding the marker 116.

Figure 4:
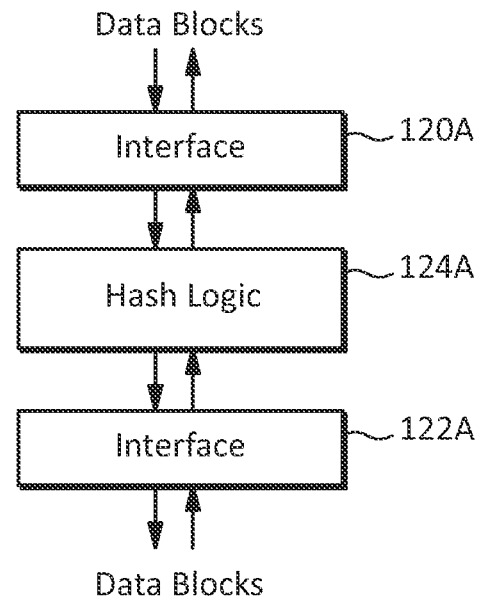
FIG. 4 illustrates another example system that may calculate hash codes for data blocks according to this disclosure.

Alternatively, the system shown in FIG. 3 may be made bi-directional as shown in FIG. 4. The system shown in FIG. 4 may include the components and functionality of the system shown in FIG. 3, but in the system shown in FIG. 4, the first interface 120A may also be configured to transmit data blocks, and the second interface 122A may also be configured to receive data blocks. The hash logic 124A may be configured to search for a marker 116 in a data block 112 received through the second interface 122A to determine an occupied portion 114 of the data block 112. The hash logic 124A may be further configured to calculate a hash code for the occupied portion 114 of the data block 112, and stop calculating the hash code in response to finding the marker 116.

The systems described with respect to FIGS. 2, 3 and 4 may reduce the time required for calculating hash codes for partially occupied data blocks at least because the system may not need to calculate a hash code on unoccupied portions of data blocks.

Figure 5:
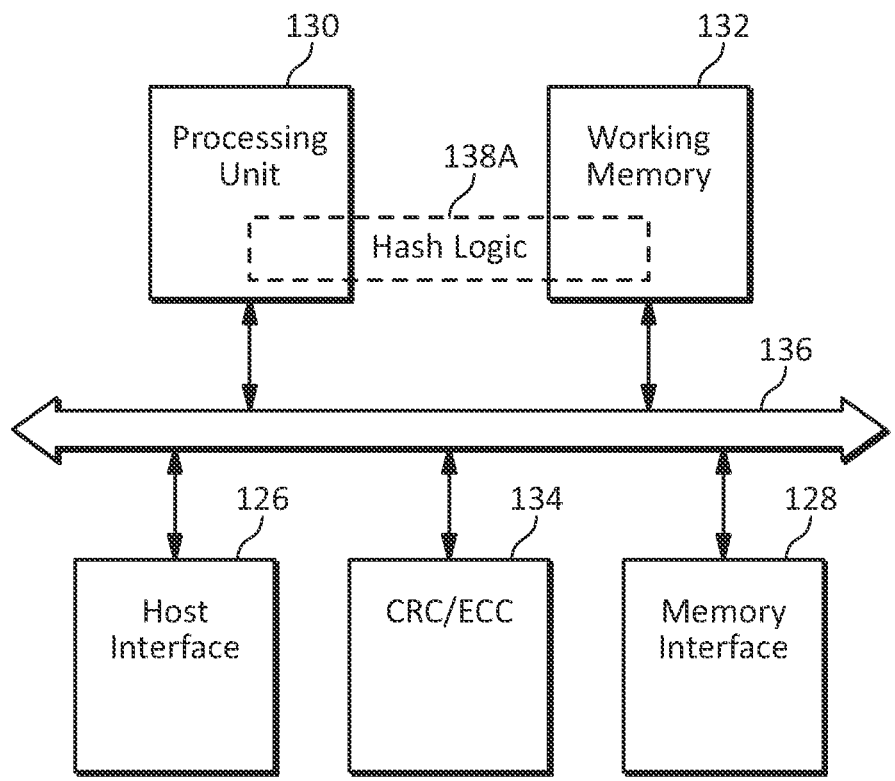
FIG. 5 illustrates an example system that may use markers and may calculate hash codes according to this disclosure.
Figure 6:
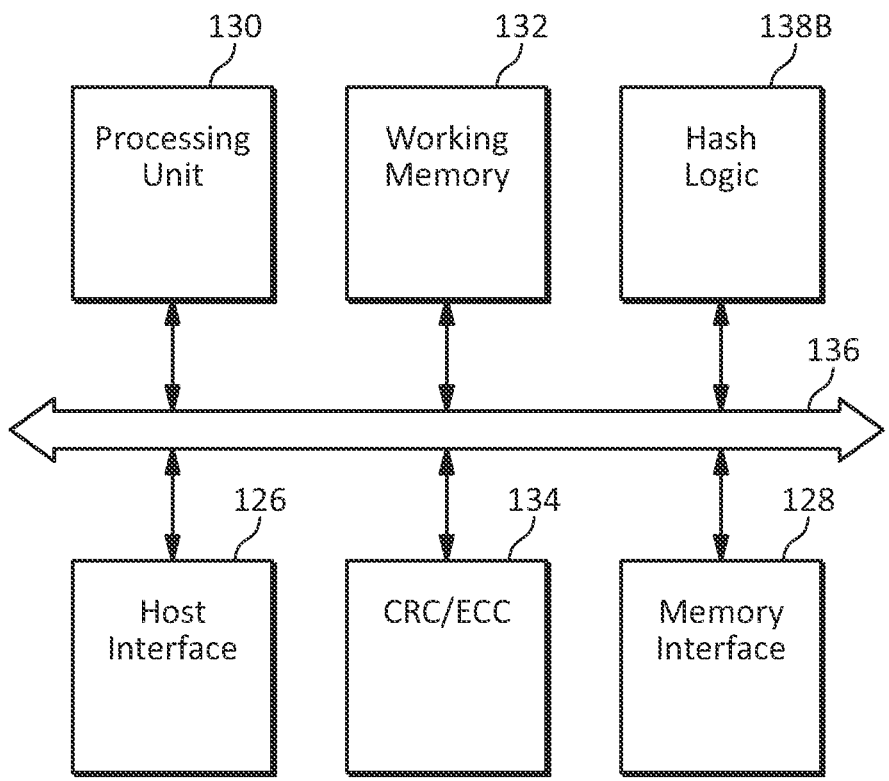
FIG. 6 illustrates another example system that may use markers and may calculate hash codes according to this disclosure.

FIGS. 5 and 6 illustrate example systems that may use markers and calculate hash codes according to this disclosure, for example to implement the systems shown in FIGS. 3 and 4. The example systems shown in FIGS. 5 and 6 illustrate some possible implementation details in the context of a controller for a solid state drive (SSD) or other storage device. These details and context are shown for purposes of illustration, but the disclosed systems are not limited to these details or context.

The example system shown in FIG. 5 includes a host interface 126, a memory interface 128, a processing unit 130, working memory 132 and cyclical redundancy check (CRC) and/or error correction code (ECC) logic 134. The components are interconnected through a bus 136. The host interface 126 may be implemented as Serial AT Attachment (SATA), Small Computer System Interface (SCSI), Serial Attached SCSI (SAS), Peripheral Component Interconnect Express (PCIe), or any other suitable interface. The memory interface 128 may be implemented as a flash or other non-volatile memory (NVM) interface which typically provides access to banks of memory devices through multiple channels. The processing unit 130 may be implemented with any suitable microprocessor, microcontroller, and/or the like The working memory 132 may include both volatile and non-volatile memory (i.e., firmware) to support operation of the processing unit 130. The CRC and/or ECC logic 134 may be implemented as dedicated hardware as shown in FIG. 5, or it may be implemented as software/firmware using the processing unit 130 and working memory 132. The example system shown in FIG. 5 may be used, for example, to implement the functions of a flash translation layer (FTL) in an SSD.

In the example system shown in FIG. 5, the hash logic 138A may be implemented as software and/or firmware using the processing unit 130 and working memory 132. For example, the processing unit 130 may execute instructions stored in a non-volatile portion of the working memory 132 and operate on data stored in a random access memory (RAM) portion of the working memory 132. Alternatively, instructions for implementing the hash logic 138A may be stored in non-volatile memory accessed through the memory interface 128.

The example system shown in FIG. 6 is similar to that shown in FIG. 5, but in the system shown in FIG. 6, the hash logic 138B is implemented with hardware coupled to the bus 136. Examples of hardware include a programmable logic device (PLD), a field programmable gate array (FPGA), and application specific circuitry. In such an implementation, the hash logic 138B may calculate hash codes faster and may also require fewer and shorter accesses of the system bus 136. Thus, it may release the bus to other modules which may benefit overall system performance. The systems shown in FIGS. 5 and 6 may be used to provide hash code protection to data blocks in addition to, or as an alternative to, the CRC and/or ECC logic 134.

Another example application of the disclosed systems shown in FIGS. 5 and 6 may include implementing a file system to store configuration data, host inquiry pages, mode pages, log pages, and other files to support firmware for solid state drive (SSD) operations. The file system volume may be implemented in a number of pages in flash memory where file data and meta blocks (managing file data) are stored. For example, the tail mark detection and/or insertion, and/or the like may be implemented in firmware along with the file system itself. In such a system, the CRC and/or ECC logic may provide error checking for all data blocks flowing through the system, while the hash logic 138A or 138E may provide additional error checking for data blocks used for the file system. In such a system, the marker may or may not be included in hash code calculations. If the marker is not included in the hash code calculations, the marker may still be protected by the CRC and/or ECC logic. In such a system, there may be primary and mirror copies of negative-AND (NAND) memory pages. That is, entire pages, which may include data blocks including markers and padding bytes may first be protected and/or corrected by NAND page CRC and/or ECC logic. If there are any errors in the marker, a physical page read may have failed. Accordingly, a NAND controller may return an error and read a mirror copy which may be used to repair the bad page. File systems implemented using the systems shown in FIGS. 5 and 6 may have increased reliability because the hash code calculations may provide additional protection to actual user data in addition to the protection provided by the CRC and/or ECC logic.

Figure 7A:
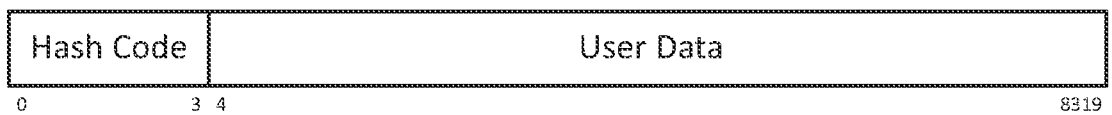
FIGS. 7A, 7B and 7C illustrate n example data block structure according to this disclosure.
Figure 7B:
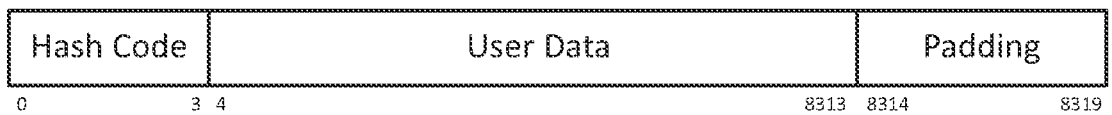
Figure 7C:
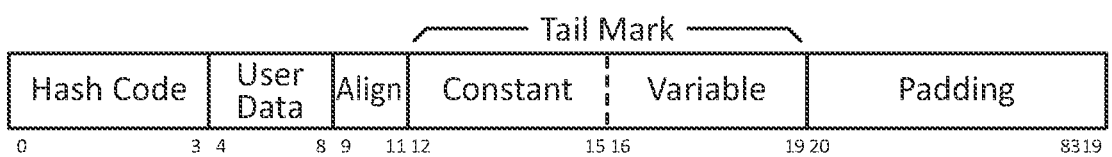

FIGS. 7A, 7B and 7C illustrate an example data block structure that may be used with the disclosed systems. The data block structure shown in FIG. 7 illustrates some possible implementation details, but these details are shown for purposes of illustration, and the disclosed systems are not limited to these details.

In the data block structure shown in FIGS. 7A, 7B and 7C, the data block is 8320 bytes long, and data is aligned on 4-byte boundaries, but other block lengths and alignments may be used. The hash code is 4 bytes long and is positioned at the beginning of the block which is also the beginning of the occupied portion of the block, but the hash code may have a different or variable length. The hash code may be positioned at other places in the occupied or unoccupied portions of the block. The hash code may be stored outside of the block (e.g., in a different block, in a header for the block, in metadata for the block, in a separate location such as a table for a file system, in a separate queue, and/or the like).

In the example shown in FIG. 7A, the hash code takes up bytes 0-3, and user data takes up the entire remaining 8316 bytes of the block at locations 4-8319. Thus the block is fully occupied, there is no unoccupied portion of the data block, and no marker is used.

In the example shown in FIG. 7B, the hash code again takes up bytes 0-3, and user data takes up 8310 bytes at locations 4-8313. Thus, there is an unoccupied portion of the block that is 6 bytes long. Since the marker in this example is 8 bytes long, there is not enough unoccupied space for a marker, and the unoccupied space is filled with padding bytes at locations 8314-8319.

In the example shown in FIG. 7C, the hash code again takes up bytes 0-3, and user data takes up 5 bytes at locations 4-8. Because data is aligned on 4-byte boundaries, the 3 bytes at locations 9-11 may be filled with padding bytes to bring the alignment back to 4-byte boundaries. Because there are only 12 bytes in the occupied portion of the block, the unoccupied portion of the block is 8300 bytes long from locations 12-8319.

A marker, in this example a tail mark that is 8 bytes long, may be inserted in the unoccupied portion of the block immediately after the align bytes at locations 12-19, and the remainder of the unoccupied portion (8300 bytes) is filled with padding bytes. In this example, the tail mark has a 4-byte constant or fixed portion followed by a 4-byte variable portion. The constant portion may be set to a predetermined 4-byte hex code such as "T@9!" or any other suitable pattern. The variable portion may be set to a 4-byte value that may be determined from the hash code, for example, but taking the logical exclusive-or (also designated as "xor" or "^") of the hash code and a hash seed or other suitable value. Using a marker with both constant and variable portions may enable a hash function or other hardware, software, firmware or combination thereof, to efficiently locate the end of the occupied user data portion of the block while preventing false detections caused by valid user data that might happen to match the pattern of the marker.

Although the example data block structure shown in FIGS. 7A, 7B and 7C uses an 8-byte tail mark with constant and variable portions, many other configurations may be used. The marker may be any suitable length, e.g., 1 byte, 2 bytes, 16 bytes, and/or the like, and may be made up of any type of suitable components (e.g., all variable data generated through various algorithms, all constant data, and/or the like), and the marker may be located at any suitable place in the data block. For example, rather than a tail mark, the marker may be implemented as a head mark located at or near the beginning of the occupied user data portion which may be aligned at the end of the data block. There may be more than one marker. For example, a head mark and a tail mark may bracket the occupied portion which may be located anywhere in the data block. A data block may have more than one occupied portion with any number and configuration of markers to indicate the locations of the occupied portions. Markers need not be located precisely at the beginning(s) and/or end(s) of the occupied portion(s). In some alternative systems, a marker or markers may be implemented as one or more addresses, offsets, or pointers located anywhere in a data block that indicate the location or locations of one or more portions of the block that may be occupied with user data.

In systems in which a marker or markers are located in one or more unused portions of a data block, the marker(s) may provide the benefit of not reducing the storage capacity of the data blocks because the marker(s) may only be inserted into a portion or portions of blocks that would be unused anyway.

Figure 8:
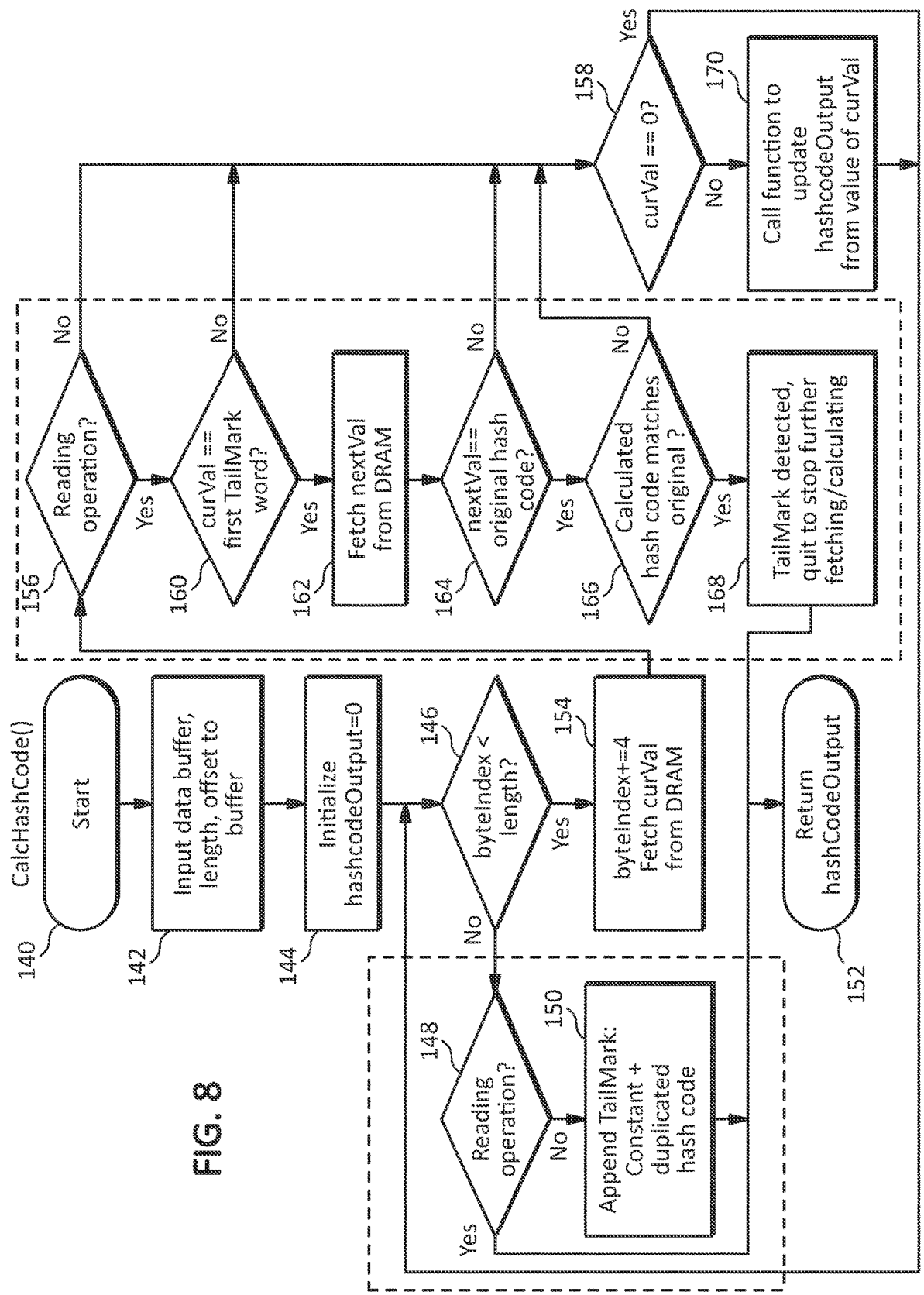
FIG. 8 is a flowchart illustrating example operations for performing a hash code calculation function according to this disclosure.

FIG. 8 is a flowchart illustrating example operations for performing a hash code calculation according to this disclosure. The example function (CalcHashCode( )) shown in FIG. 8 illustrates some possible implementation details in the context of a system using a tail mark, but these details are shown for purposes of illustration, and the disclosed systems are not limited to these details or context.

In the example shown in FIG. 8, the portions based on tail mark detection are shown within dashed lines while the remainder is conventional hash code calculation. The function starts at element 140. At element 142, the data buffer address, length, and offset to the buffer are input to the function to provide access to the data block that is to be written or has been read. At element 144, the output of the hash code function is initialized to zero. At element 146, the function checks if the end of the user data has been reached. If it has been reached ("No" branch), the function checks whether it is a read or write operation at element 148. If it is a write operation, the function duplicates xor'ed value of the hash code to create the variable part of the tail mark which will be used by the AppendTailMark( ) function at element 150 to insert the tail mark in the data block (if there is enough unoccupied room), then terminates at element 152 while returning the calculated value of the hash code.

At element 146, if the function determines that the end of the user data has not been reached, the function proceeds to element 154 where the byte index is incremented by 4 (for 4-byte alignment). At element 156, the function branches to element 158 for a write operation or 160 for a read operation. At element 160 the function branches to element 158 if the constant portion of the tail mark is encountered or to element 162 if not. At element 162 the next 4 bytes of the data block are fetched. At element 164, the function branches to element 158 if the fetched bytes are not the original hash code or to element 166 if they are. At element 166 the function branches to element 158 if the calculated hash code matches the stored hash code, or the function branches to element 168 if it does not match. If the calculated hash code matches the stored hash code it means that the tail mark has been detected, so the function can stop further data fetches and calculations. The function terminates at element 152 while returning the calculated value of the hash code.

At element 158, if the value of the current 4 bytes of data is zero, the function skips to element 146 to save time, i.e., it bypasses values of zero. Otherwise, it continues calculating the hash code using the current 4 bytes of data at element 170 then returns to element 146.

Figure 9:
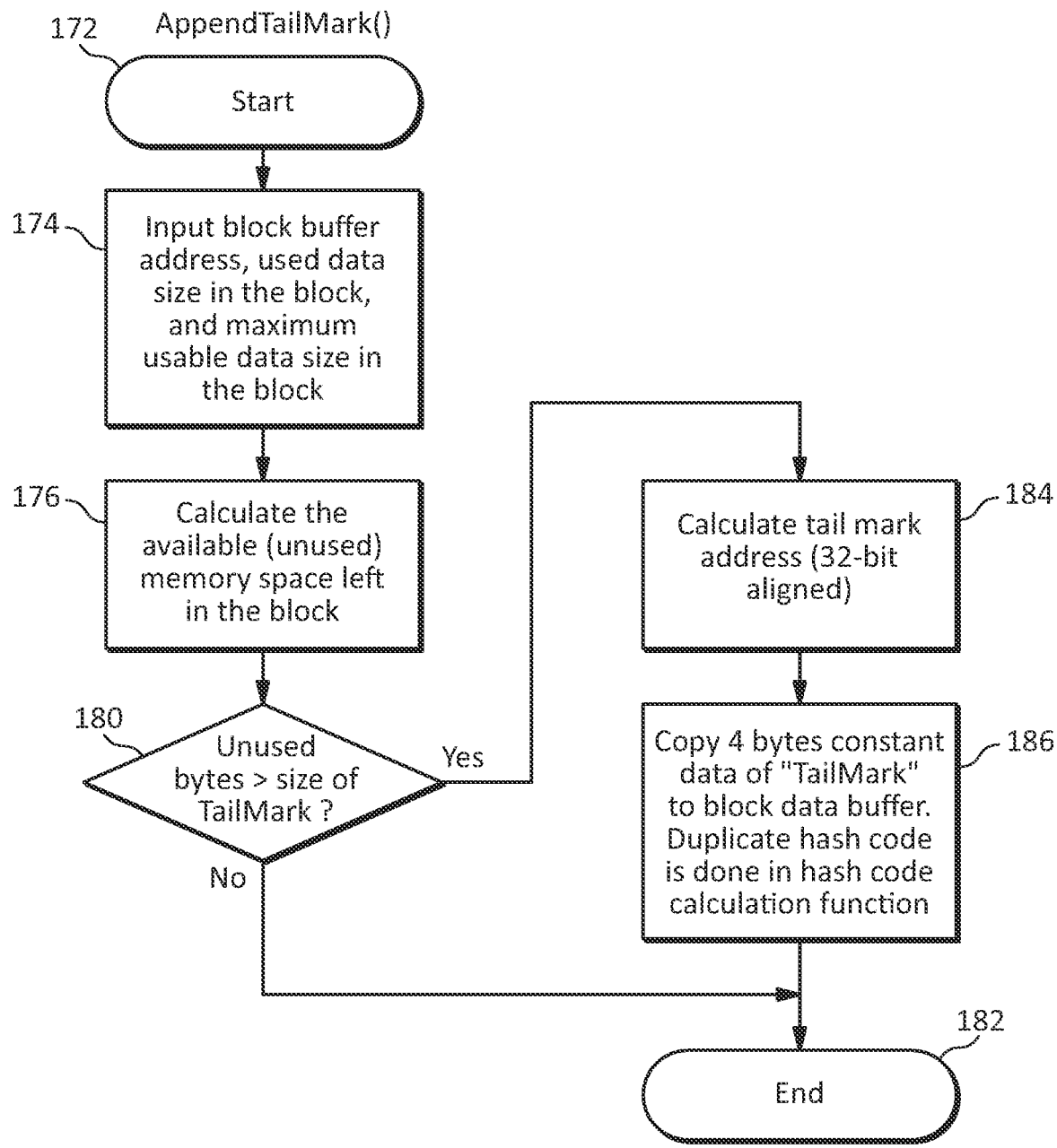
FIG. 9 is a flowchart illustrating an example operation for executing a function to insert a tail mark in an unoccupied portion of a data block according to this disclosure.

FIG. 9 is a flowchart illustrating an example operation for executing a function to insert a tail mark in an unoccupied portion of a data block according to this disclosure. The example function (AppendTailMark( )) may insert the tail mark in the data block to mark the end of the occupied portion of the block if there is enough unoccupied room. The function may use the output of the hash code calculation function (CalcHashCode( )) for the variable portion of the tail mark. The example shown in FIG. 9 illustrates some possible implementation details in the context of a system using a tail mark, but these details are shown for purposes of illustration, and the disclosed systems are not limited to these details or context.

The function starts at element 172. At element 174, the block buffer address, used data size, and maximum usable data block size are input to the function to enable the function to calculate the size of the unoccupied portion of the data block at element 176. At element 180, the function determines if the size of the unoccupied portion of the data block is large enough to accommodate a tail mark. If the unoccupied portion of the data block is too small for a tail mark, the function terminates at element 182 and the unoccupied portion remains as padding bytes. If there is enough room for a tail mark, the function calculates the tail mark position (on a 4-byte aligned boundary) at element 184. At element 186, the function then inserts the 4-byte constant portion of the tail mark and the 4-byte variable portion of the tail mark, which is the hash code calculated by the function CalcHashCode( ), into the data block at the calculated position. The function terminates at element 182.

Figure 10A:
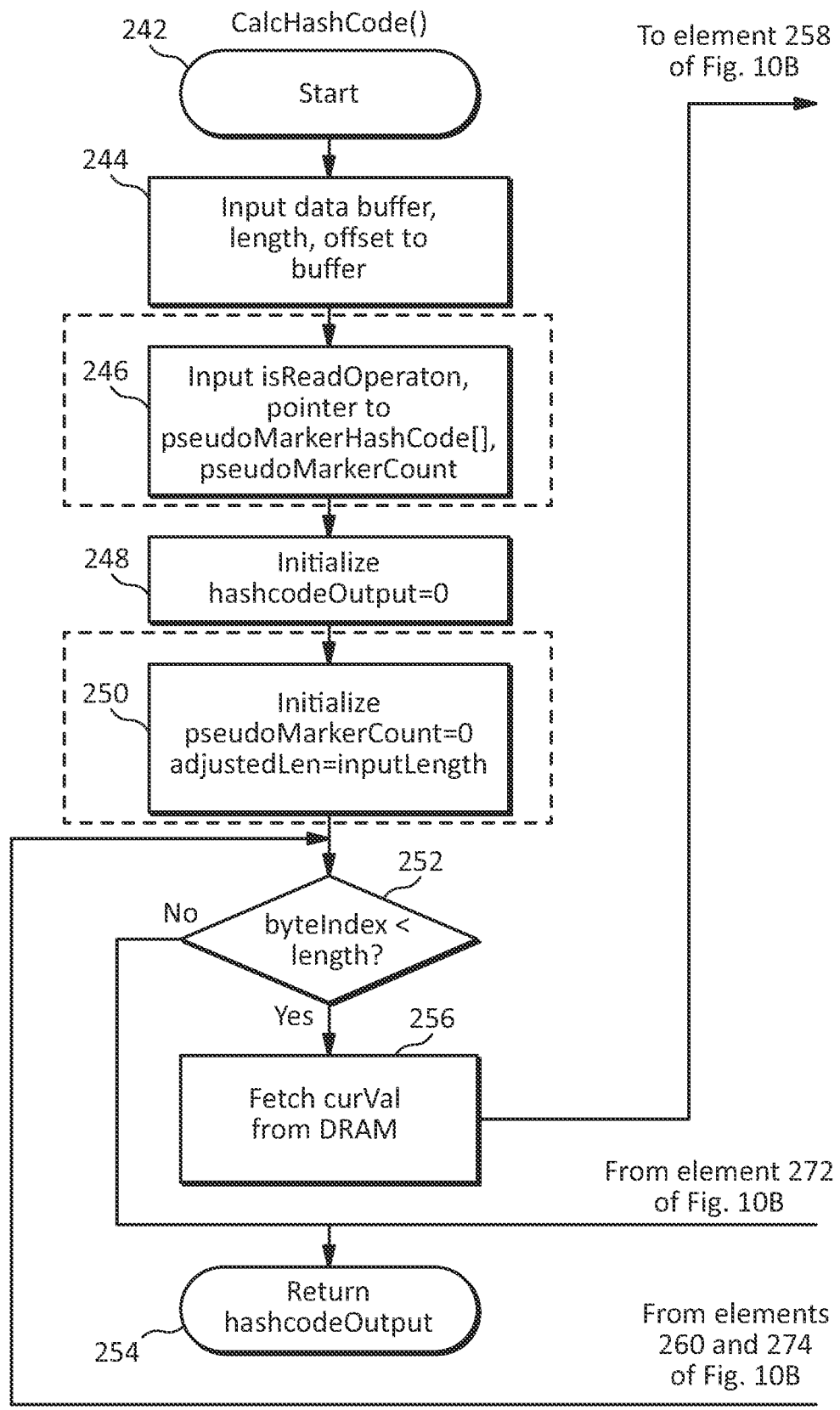
FIGS. 10A and 10B taken together form a whole drawing of a flowchart illustrating alternative example operations for performing a hash code calculation according to this disclosure.
Figure 10B:
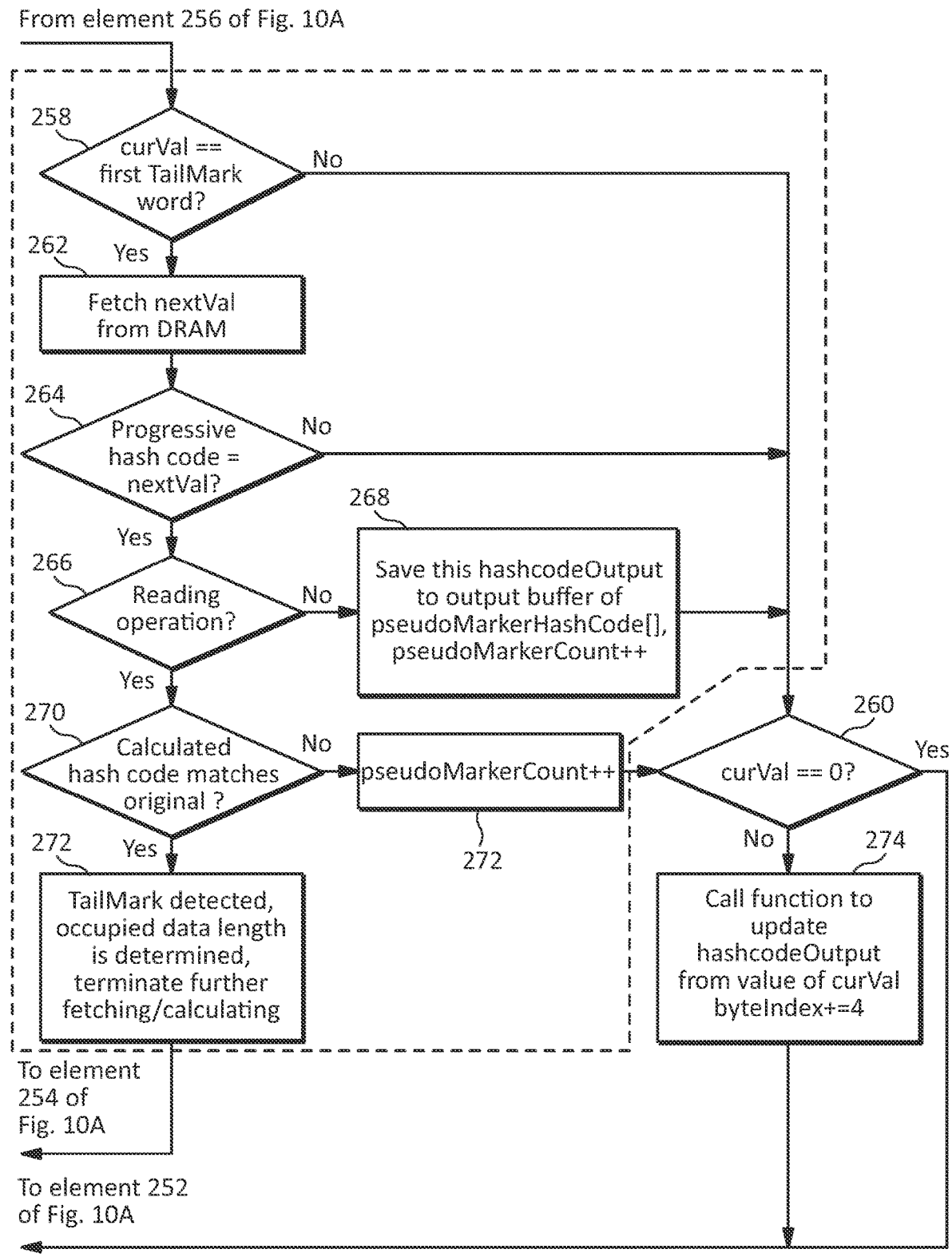
Figure 11:
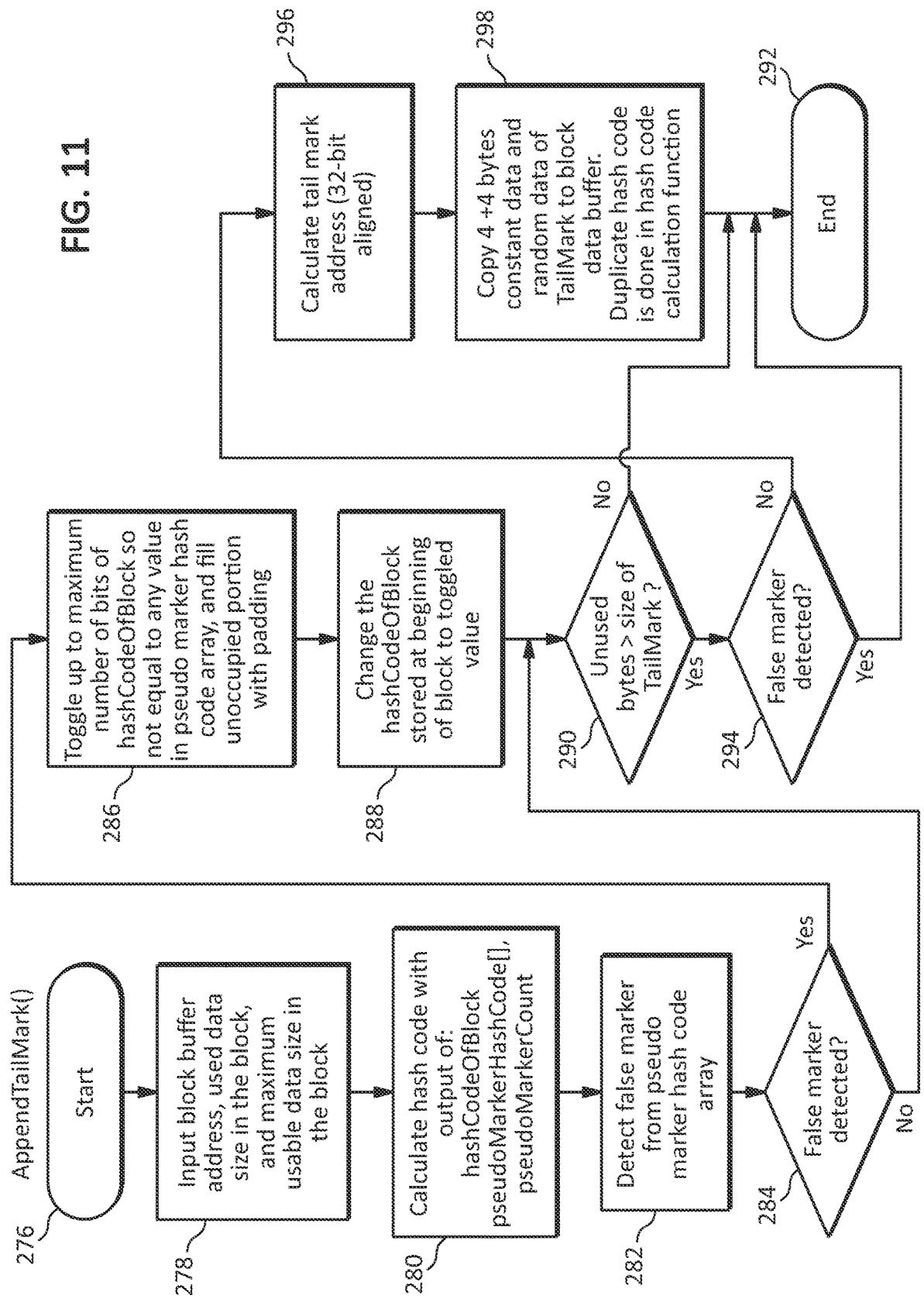
FIG. 11 is a flowchart illustrating an alternative example operation for executing a function to insert a tail mark in an unoccupied portion of a data block according to this disclosure.

FIGS. 10A and 10B taken together form a flowchart illustrating alternative example operations for performing a hash code calculation according to this disclosure. FIG. 11 is a flowchart illustrating an alternative example operation for executing a function to insert a tail mark in an unoccupied portion of a data block according to this disclosure. The examples shown in FIGS. 10A, 10B and 11 illustrate some possible implementation details in the context of a system using a tail mark, but these details are shown for purposes of illustration, and the disclosed systems are not limited to these details or context.

The examples shown in FIGS. 10A, 10B and 11 may search for a false marker while processing a block of data. A false marker may be a pattern of user data having a first portion that matches the constant portion of a marker and a second portion that matches the hash code for the data block. However, a false marker may appear in the user data by coincidence rather than being placed in the block intentionally by the system as in the case of a true marker. If the system finds a false marker during a write operation, the system may modify the hash code stored in the block to provide a unique hash code that does not match the variable portion of a false marker in the user data. For example, the system may modify the hash code by toggling a designated number of bits of the hash code. During a read operation, the system may accommodate a modified hash code when comparing the stored hash code to the calculated hash code. For example, the system may allow the stored hash code to differ from the calculated hash code by the designated number of bits. If the system finds a false marker during a write operation, the system may also omit inserting a marker in the block.

The examples shown in FIGS. 10 and 11 may search for a false marker by creating a list of hash codes from pseudo markers found during a hash code calculation. A pseudo marker may be a pattern located at a specific point in the user data. The pseudo marker may have a first portion that matches the constant portion of a marker and a second portion that matches the hash code that has been calculated when the hash code function has progressed to the specific point in the user data. A pseudo marker may potentially be a false marker, but the system does not know if it is a false marker until the final hash code has been calculated for the user data in the entire occupied portion of the data block. After the final hash code has been calculated, the system may compare the final hash code to the list of hash codes from pseudo markers found during the hash code calculation. If a hash code from a pseudo marker matches the final hash code for the data block, the pseudo marker with the matching hash code is considered a false marker.

Referring to FIG. 10, the portions based on tail mark detection are shown within dashed lines while the remainder is conventional hash code calculation. The function starts at element 242. At element 142, the data buffer address, length, and offset to the buffer are input to the function to provide access to the data block that is to be written or has been read. At element 244, a boolean value indicating whether the function is being used in a read or write operation is input to the function. Also at element 244, a pointer to an array for storing a list of hash codes for pseudo markers is input to the function, and a pseudo marker count is also input to the function. At element 248, the output of the hash code function is initialized to zero. At element 250, the pseudo marker count is initialized to zero, and the adjusted length of the occupied portion of the data block is set to the initial input length.

At element 252, the function checks if the end of the user data has been reached. If it has been reached ("No" branch), the function terminates at element 254 while returning the calculated value of the hash code. At element 252, if the function determines that the end of the user data has not been reached ("Yes" branch), the function proceeds to element 256 where the next current data value is fetched from the buffer in DRAM. The function then proceeds to element 258 where the function checks if the current data value is equal to the constant portion of a tail mark. If the current data value is not equal to the constant portion of a tail mark, the function proceeds to element 260. If it is equal to the constant portion of a tail mark, the function fetches the next data value from the buffer in DRAM at element 262. At element 264, the compares the next data value to the current value of the progressively calculated hash code. If they are not equal, the function proceeds to element 260. If the next data value matches the current value of the progressively calculated hash code, the function branches to element 268 if the function is being used for a write operation, or to element 270 if the function is being used for a read operation. At element 268 the function saves the currently calculated hash code to the array of hash codes for pseudo markers, then increments the pseudo marker count and proceeds to element 260.

At element 270, the function determines if the current value of the progressively calculated hash code matches the original stored hash code. If they do not match, the function increments the pseudo marker count and proceeds to element 260. If they match, it indicates that a true tail mark has been detected at element 272, the occupied data length is determined (adjustedLen=byteIndex), and the function terminates the fetching and calculating operation. The function then terminates at element 254 and returns the calculated value of the hash code.

At element 260, if the value of the current 4 bytes of data is zero, the function skips to element 252 to save time, i.e., it bypasses values of zero. Otherwise, it continues calculating the hash code using the current 4 bytes of data at element 274 where the byte index is incremented by 4 (for 4-byte alignment). The function then returns to element 252.

Referring to FIG. 11, the function for appending a tail mark starts at element 276. At element 278, the block buffer address, used data size, and maximum usable data block size are input to the function to enable the function to calculate the size of the unoccupied portion of the data block. At element 280, the function calls the CalcHashCode( ) function shown in FIGS. 10A and 10B which returns the hash code of the block, an array that includes a list of hash codes for pseudo markers found in the occupied portion of the block, and a pseudo marker count. At element 282, the function determines if the hash code of the data block matches any of the hash codes in the list. At element 284, if any of the hash codes for pseudo markers matches the hash code for the block, a false marker is detected, and the function proceeds to element 286. If none of the hash codes for pseudo markers matches the hash code for the block, the function proceeds to element 290.

At element 286, the function modifies the hash code of the block, for example, by toggling up to a maximum number of bits to create a unique hash code. The modified hash code of the block is then stored at the beginning of the block at element 288. At element 290, the function determines if the size of the unoccupied portion of the data block is large enough to accommodate a tail mark. If the unoccupied portion of the data block is too small for a tail mark, the function terminates at element 292. If there is enough room for a tail mark, the function checks for a false marker at element 294. If a false marker is detected, the function terminates at element 292. If a false marker is not detected, the function calculates the tail mark position (on a 4-byte aligned boundary) at element 296. At element 298, the function inserts the 4-byte constant portion of the tail mark and the 4-byte variable portion of the tail mark (which is the hash code calculated by the function CalcHashCode( ) into the da block at the calculated position. The function then terminates at element 292.

Although the disclosed systems are not limited to any particular implementation details, in one example implementation using a block size of 8320 bytes, the hash code calculation time may be reduced from about 400 us to less than about 1 us for relatively small blocks, e.g., blocks with about 10 bytes of user data.

Another potential advantage of the disclosed systems is that they may enable the use of a large block size, which may be set, e.g., to a physical page size in an SSD file system, thereby improving performance and reliability.

The disclosed systems ay be used in any suitable applications such as storage, communication, and/or the like, having data blocks that may be only partially used and checked with a hash code, checksum, and/or the like. In communications systems, for example, writing and reading operations may transfer data blocks to and from transmitters and/or receivers rather than storage devices.

Figure 12:
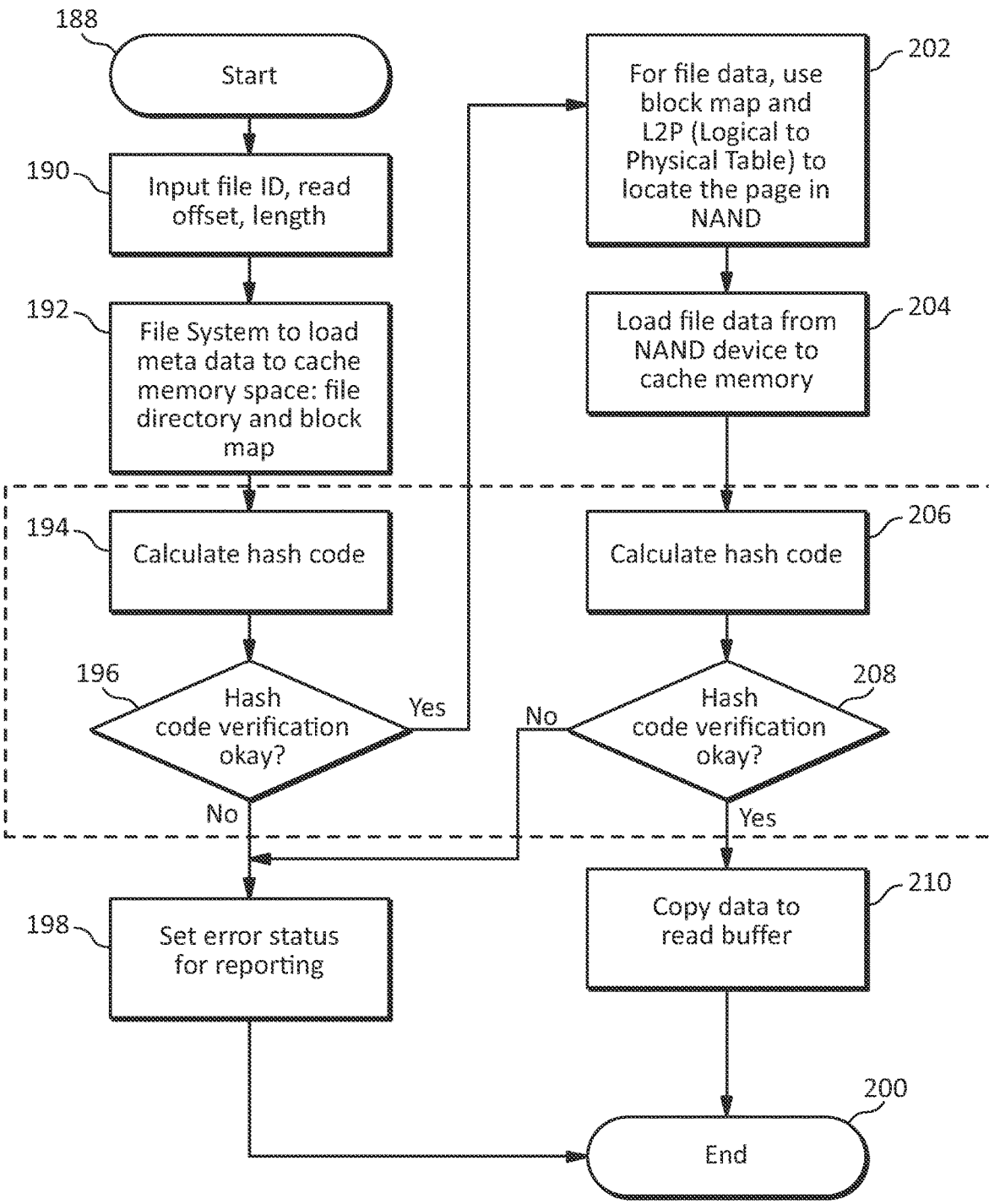
FIG. 12 is a flow chart illustrating an example file read operation that may implement hash code calculations according to this disclosure.

FIG. 12 is a flow chart illustrating an example file read operation that may implement hash code calculations according to this disclosure. Hash code calculations based on marker detection may be implemented, for example, in the portions shown within dashed lines. The example shown in FIG. 12 may be configured to store individual files in individual data blocks which may be set to the same size as pages, but the disclosed systems are not limited to these details. The file read operation begins at element 188. At element 190, the input file ID, read offset, and length are obtained. At element 192, the file system loads the meta data which includes a file directory and block map to cache. At element 194, a hash code is calculated using, for example, a tail mark or other marker to streamline the calculation process. If the hash code fails to verify at element 196, an error is reported at element 198 and the operation ends at element 200. If the hash code verifies at element 196, the page with the file is located in NAND memory at element 202 and the file data is loaded to cache at element 204. At element 206, a hash code is calculated using, again for example, a tail mark or other marker to streamline the calculation process. If the hash code fails to verify at element 208, an error is reported at element 198 and the operation ends at element 200. If the hash code verifies at element 208, the file data is copied to the read buffer, and the operation ends at element 200. In a system that uses a modified hash code in response to a false marker, any of the hash code calculation elements 194 and 206 and verification elements 196 and 208 may accommodate a modified hash code. For example, the hash code verification elements 196 and 208 may allow the stored hash code to differ from the calculated hash code by a designated number of bits.

Figure 13:
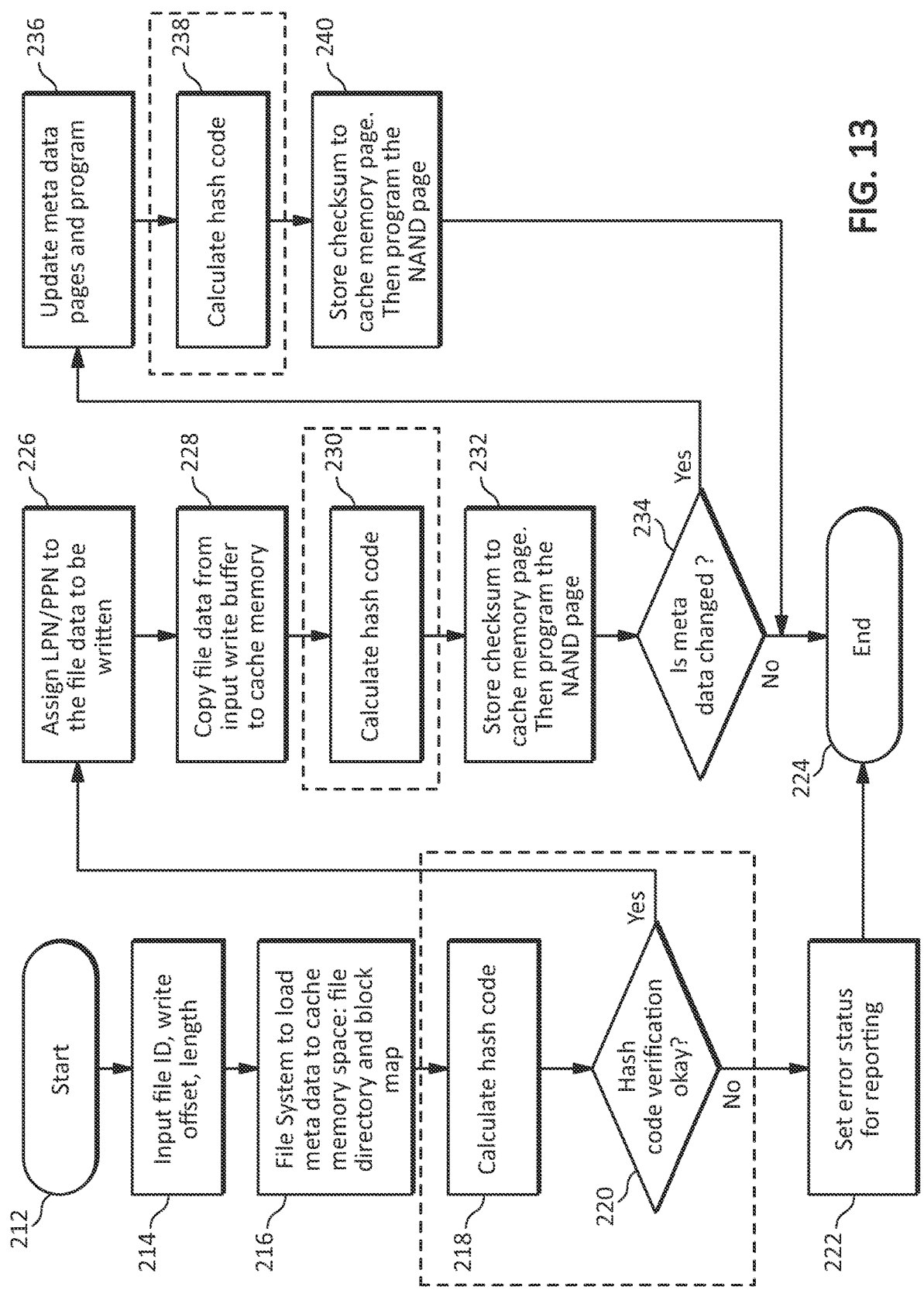
FIG. 13 is a flow chart illustrating an example file write operation that may implement hash code calculations according to this disclosure.

FIG. 13 is a flow chart illustrating an example file write operation that may implement hash code calculations according to this disclosure. Hash code calculations and/or markers according to this disclosure may be implemented, for example, in the portions shown within dashed lines. The example shown in FIG. 13 may be configured to store individual files in individual data blocks which may be set to the same size as pages, but the disclosed systems are not limited to these details. The file write operation begins at element 212. At element 214, the input file ID, write offset, and length are obtained. At element 216, the file system loads meta data which includes a file directory and block map to cache. At element 218, a hash code is calculated. If the hash code fails to verify at element 220, an error is reported at element 222 and the operation ends at element 224. If the hash code verifies at element 220, logical page numbers (LPN) and physical page numbers (PPN) are assigned to the file data to be written at element 226, and file data from the input write buffer is copied to cache memory at element 228. At element 230, a hash code is calculated. The checksum is stored to the cache memory page, and the NAND page is programmed at element 232. The meta data is checked at element 234, and if there are no changes, the operation terminates at element 224. If the meta data has changed, the meta data pages are updated and programmed at element 236. A hash code is calculated again at element 238, and at element 240, the checksum is stored to the cache memory page, and the NAND page is programmed. The write operation then terminates at element 224. In a system that uses a modified hash code in response to a false marker, either the hash code calculation element 218 or the hash code verification element 220 may accommodate a modified hash code. For example, the hash code verification element 220 may allow the stored hash code to differ from the calculated hash code by a designated number of bits.

Since the inventive principles of this patent disclosure may be modified in arrangement and detail without departing from the inventive concepts, such changes and modifications are considered to fall within the scope of the following claims.

The invention claimed is:

1. A method comprising:
   receiving, at a controller, using a first interface, a first data block comprising a first occupied portion and a first available portion;
   processing, at the controller, the first data block to generate a second data block; and
   transmitting, from the controller, to a memory, using a second interface, the second data block;
   wherein the second data block comprises a second occupied portion based on the first occupied portion, a second available portion based on the first available portion, a check code comprising reliability information for the second occupied portion, and a marker to indicate a size of the second occupied portion.

2. The method of claim 1, wherein the marker comprises a first portion and a second portion.

3. The method of claim 2, wherein the second portion of the marker is based on the check code.

4. The method of claim 1, wherein the marker is located at an end of the second occupied portion.

5. The method of claim 1, wherein the marker is located between the second occupied portion and the second available portion.

6. The method of claim 1, wherein the second available portion comprises padding data.

7. The method of claim 1, wherein the check code is based on at least a portion of the second occupied portion and at least a portion of the marker.

8. An apparatus comprising:
   a first interface circuit configured to receive, at a controller, a first data block comprising a first occupied portion and a first available portion;
   a logic circuit coupled to the interface circuit and configured to process, at the controller, the first data block to generate a second data block, wherein the second data block comprises a second occupied portion based on an occupied portion of the first data block, a second available portion based on the first available portion, a check code comprising reliability information for the second occupied portion, and a marker to indicate a size of the second occupied portion; and
   a second interface circuit configured to transmit, from the controller, the second data block.

9. The apparatus of claim 8, wherein at least a portion of the marker corresponds to at least a portion of the first available portion.

10. The apparatus of claim 9, wherein the check code is based on the marker.

11. The apparatus of claim 8, wherein:
    the first interface circuit comprises a host interface; and
    the second interface circuit comprises a non-volatile memory interface coupled to the logic circuit.

12. The apparatus of claim 11, wherein:
    the non-volatile memory interface comprises a flash memory interface; and
    the system further comprises a processor configured to operate a flash translation layer.

13. The apparatus of claim 12, wherein the processor is configured to implement a file system for the flash translation layer.

14. A method comprising:
    processing, at a controller, a first data block to generate a second data block, wherein the second data block comprises an occupied portion based on an occupied portion of the first data block, an available portion based on an available portion of the first data block, a check code based on the occupied portion of the second data block, and a marker to indicate a size of the occupied portion of the second data block;

transmitting, from the controller, the second data block;

receiving, at a file system, the second data block;

finding the marker in the second data block; and determining, based on finding the marker, the second occupied portion of the second data block.

15. The method of claim 14, wherein:

at least a portion of the marker corresponds to at least a portion of the occupied portion of the second data block; and the check code is further based on the marker.

16. The method of claim 15, wherein:

the check code is a first check code;

the first check code is based on a second check code; and the second check code is based on a check code function and the occupied portion of the second data block.

17. The method of claim 14, wherein:

the marker comprises a first portion and a second portion; and the second portion is based on the check code.

18. The method of claim 1, further comprising:

receiving, at a file system, the second data block;

finding the marker in the second data block; and determining, based on finding the marker, the second occupied portion of the second data block.

19. The apparatus of claim 8, further comprising a file system configured to:

receive the second data block;

determine a location of the marker in the second data block; and determine, based on the location of the marker, the second occupied portion of the second data block.

* * * * *